United States Patent
Nevet et al.

(10) Patent No.: US 8,669,512 B2
(45) Date of Patent: Mar. 11, 2014

(54) SYSTEM AND METHOD FOR ANALYZING LIGHT BY THREE-PHOTON COUNTING

(75) Inventors: Amir Nevet, Haifa (IL); Alex Hayat, Carmiel (IL); Meir Orenstein, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 239 days.

(21) Appl. No.: 13/338,386

(22) Filed: Dec. 28, 2011

(65) Prior Publication Data
US 2012/0160993 A1 Jun. 28, 2012

Related U.S. Application Data

(60) Provisional application No. 61/427,491, filed on Dec. 28, 2010.

(51) Int. Cl.
*H01J 40/14* (2006.01)

(52) U.S. Cl.
USPC ......... 250/214.1; 250/550; 356/450; 398/206

(58) Field of Classification Search
USPC ........... 250/550, 214.1, 214 A, 216; 356/450, 356/520, 317; 398/25, 147, 206, 207, 212, 398/213
See application file for complete search history.

(56) References Cited

U.S. PATENT DOCUMENTS

| | | | |
|---|---|---|---|
| 5,754,292 A * | 5/1998 | Kane et al. | 356/450 |
| 6,734,976 B2 | 5/2004 | Sun et al. | |
| 2004/0151495 A1 * | 8/2004 | Knox et al. | 398/25 |

OTHER PUBLICATIONS

Boitier et al. "Measuring Photon Bunching at Ultrashort Timescale by Two-Photon Absorption in Semiconductors", Nature Physics, 5: 267-270, Apr. 2009.
Boitier et al. "Second Order Coherence of Broadband Down-Converted Light on Ultrashort Time Scale Determined by Two Photon Absorption in Semiconductor", Optics Express, 18(19): 20401-20408, Sep. 13, 2010.
Boitier et al. "Two Photon Counting: Theory and Experiment", IEEE Quantum Electronics and Laser Science Conference (QELS), San Jose, CA, USA, May 16, 2010, Paper QTuE1.
Horikiri et al. "Higher Order Coherence of Exciton-Polation Condensates", Physical Review B, 81: 033307-1-033307-4, 2010.
Hübel et al. "Direct Generation of Photon Triplets Using Cascaded Photon-Pair Sources", Nature, 466: 601-603, Jul. 29, 2010.
Langlois et al. "Measurment of Pulse Asymmetry by Three-Photon-Absorption Autocorrelation in a GaAsP Photodiode", Optics Letters, 24(24: 1868-1870, Dec. 15, 1999.
Pearl et al. "Three Photon Absorption in Silicon for 2300-3300 NM", Applied Physics Letters, 93: 131102-1-131102-3, 2008.

(Continued)

*Primary Examiner* — Kevin Pyo

(57) ABSTRACT

A system for measuring one or more characteristics of light of a photon energy $E_{ph}$ from a light source, that can be determined from measuring three-photon absorption events, the system comprising:
 a) a detector having a band gap material characterized by gap energy between 2.1 and 3 times $E_{ph}$;
 b) an optical element configured to concentrate a beam of light from the light source on the detector;
 c) a signal amplifier that amplifies an output signal indicative of when three photons produced by the light source undergo a three-photon absorption event in the band gap material; and
 d) an analyzer that analyzes the output signal to count or measure a rate of the three-photon absorption events, and determines the one or more characteristics of the light from the light source.

29 Claims, 5 Drawing Sheets

(56) References Cited

OTHER PUBLICATIONS

Roth et al. "Ultrasensitive and High-Dynamic-Range Two-Photon Absorption in A GaAs Photomultiplier Tube", Optics Letters, 27(23): 2076-2078, Dec. 1, 2002.

Walmsley et al. "Characterization of Ultrashort Electromagnetic Pulses", Advances in Optics and Photonics, 1: 308-437, 2009.

Wikipedia "NOON State", Wikipedia, the Free Encyclopedia, Aug. 19, 2010.

Feurer et al. "Measuring the Temporal Intensity of Ultrashort Laser Pulses by Triple Correlation", Applied Physics B, 66: 163-168, 1998.

Hamamatsu Photonics "Basics and Applications", Photomultiplier Tubes, PMT Handbook, Hamamatsu Photonics K.K., 3rd Ed.(Ed. 3a): 1-323, Aug. 2007.

Hurlbut et al. "Multiphoton Absorption and Nonlinear Refraction of GaAs in the Mid-Infrared", Optics Letters, 32(6): 668-670, Mar. 15, 2007.

Liu et al. "Characterization of Ultrashort Optical Pulses With Third-Harmonic-Generation Based Triple Autocorrelation", IEEE Journal of Quantum Electronics, 38(11): 1529-1535, Nov. 2002.

Wei et al. "High Sensitivity Third-Order Autocorrelation Measurement by Intensity Modulation and Third Harmonic Detection", Optics Tetters, 36(12): 2372-2374, Jun. 15, 2011.

Wikipedia "Single-Photon Avalanche Diode", Wikipedia, the Free Encyclopedia, 4 P., Dec. 8, 2011.

* cited by examiner

SYSTEM AND METHOD FOR ANALYZING LIGHT BY THREE-PHOTON COUNTING

RELATED APPLICATION

This application claims the benefit of priority under 35 USC 119(e) of U.S. Provisional Patent Application No. 61/427,491 filed on Dec. 28, 2010, the contents of which are incorporated herein by reference in their entirety.

FIELD AND BACKGROUND OF THE INVENTION

The present invention, in some embodiments thereof, relates to a system and method for measuring three-photon absorption events, and, more particularly, but not exclusively, to a system and method for measuring a three-photon absorption rate or counting three-photon absorption events, using a photon counting detector.

There is a need for characterizing light sources, including in ways that cannot be achieved by measuring one-photon or two-photon processes. For example, Ian A. Walmsley and Christophe Dorrer, "Characterization of ultrashort pulses," Advances in Optics and Photonics 1, 308-437 (2009), describe the need to measure the shapes of pulses on femtosecond timescales, far too short to measure directly with any light detector, and reviews some of the techniques that have been developed to do this. Patrick Langlois and Erich P. Ippen, "Measurement of pulse asymmetry by three-photon absorption autocorrelation in a GaAsP photodiode," Optics Letters 24, 1868-1870 (1999), the contents of which are hereby incorporated by reference, describe using an autocorrelator interferometer, and three-photon absorption in GaAsP, which is a direct band gap material, to measure the asymmetry of such ultrashort pulses, and point out that this cannot be done with one-photon or two-photon absorption. Shaul Pearl, Nir Rotenberg, and Henry M. van Driel, "Three photon absorption in silicon for 2300-3300 nm," Applied Physics Letters 93, 131102 (2008), describe using silicon, an indirect band gap semiconductor, for three-photon absorption.

Tomoyuki Horokiri et al, "Higher order coherence of exciton-polariton condensates," Physical Review B 81, 033307 (2010), describes the use of coincidence measurements from three single-photon detectors to measure the third order coherence function $g^{(3)}(0)$ in light emitted by a polariton laser. The authors use the results to show that a polariton condensate differs from a fully coherent state such as the light from an ordinary laser, as well as from light in a definite photon number state, or light in a thermal state, and explains the results with a model involving polariton-polariton and polariton-phonon interactions.

J. M. Roth, T. E. Murphy, and C. Xu, "Ultrasensitive and high-dynamic-range two-photon absorption in a GaAs photomultiplier tube," Opt. Lett. 27, 2076 (2002), describes two-photon counting of 1.5 μm light with a GaAs photomultiplier tube. Lower power light was detected, and over a greater dynamic range, than in previous work where residual one-photon counting dominated at low power. The light was pulsed, and the width of the pulses was measured using two-photon counting with a Michelson interferometer.

A series of papers by Boitier and colleagues describes using two-photon counting, with a semiconductor detector, to measure the second order coherence function $g^{(2)}(\tau)$ of various light sources on a femtosecond timescale, including a blackbody source, a source generating two-photon pairs by parametric fluorescence, a laser, and an Amplified Spontaneous Emission source. These papers are: F. Boitier, A. Godard, E. Rosencher, and C. Fabre, "Measuring photon bunching at ultrashort timescale by two-photon absorption in semiconductors," Nature Physics 5, 267-270 (2009); Fabien Boitier et al, "Second order coherence of broadband down-converted light on ultrashort time scale determined by two photon absorption in semiconductor," Optics Express 18, 20401-20408 (2010); and F. Boitier, A. Godard, E. Rosencher, and C. Fabre, "Two photon counting: theory and experiment," presented at Quantum Electronics and Laser Science Conference (QELS), San Jose, Calif., May 16, 2010, paper QTuE1.

Hannes Hübel et al, "Direct generation of photon triplets using cascaded photon-pair sources," Nature 466, 601-603 (2010), describes recent advances in producing three-photon entangled states, which can be used for quantum communication and quantum computing.

T. Feurer, S. Niedermeier, and R. Sauerbrey, "Measuring the temporal intensity of ultrashort laser pulse by triple correlation," Appl. Phys. B 66, 163-168 (1998), the contents of which are hereby incorporated by reference, describes using third harmonic generation of light in a nonlinear crystal to measure the triple autocorrelation function, a function of two time delays, for ultrashort laser pulses, and using the triple autocorrelation function to calculate the shape of the pulses. Tzu-ming Liu et al, "Characterization of Ultrashort Optical Pulses with Third-Harmonic-Based Triple Autocorrelation," IEEE J Quantum Electronics 38, 1529-1535 (2002), extends the work of Feuer et al, using the optical spectrum, in addition to the triple autocorrelation function, to find not only the pulse shape, but also the color and phase of the light as a function of time within a pulse.

SUMMARY OF THE INVENTION

An aspect of some embodiments of the invention concerns a system and method for measuring three-photon absorption in a photon counting detector, using light produced by a light source, and using the data to determine one or more characteristics of the light emitted by the light source.

There is thus provided, according to an exemplary embodiment of the invention, a system for measuring one or more characteristics of light of a photon energy $E_{ph}$ from a light source, that can be determined from measuring three-photon absorption events, the system comprising:
a) a detector having a band gap material characterized by gap energy between 2.1 and 3 times $E_{ph}$;
b) an optical element configured to concentrate a beam of light from the light source on the detector;
c) a signal amplifier that amplifies an output signal indicative of when three photons produced by the light source undergo a three-photon absorption event in the band gap material; and
d) an analyzer that analyzes the output signal to count or measure a rate of the three-photon absorption events, and determines the one or more characteristics of the light from the light source.

Optionally, the system also includes the light source.

Optionally, the light source and optical element are configured for producing a light intensity I on the detector, and the band gap material has a thickness of at least 0.5 times a minimum of an absorption length for three-photon absorption of light of photon energy $E_{ph}$ and intensity I in the band gap material, and a Rayleigh length for the light beam concentrated on the band gap material.

Optionally, the band gap material has a thickness no greater than twice a diffusion length of electrons in the conduction band of the band gap material.

Optionally, the optical system concentrates the light from the light source so that more than half of the power falls within a spot smaller than 10 wavelengths in diameter, on the detector.

Optionally, the light source produces few enough photons of energy greater than half the gap energy of the band gap material, so that any two-photon or one-photon absorption in the detector contributes less to the output signal than three-photon absorption, by at least a factor of 10.

Additionally or alternatively, the system comprises a filter that filters out enough photons of energy greater than half the gap energy of the band gap material, so that any two-photon or one-photon absorption in the detector contributes less to the output signal than three-photon absorption, by at least a factor of 10.

Optionally, more than 90% of the three-photon absorption events produced in the band gap material by photons from the light source are due to entangled three-photon states, and the one or more characteristics comprise a number of entangled three-photon states emitted by the light source.

Optionally, the one or more characteristics comprise a magnitude and direction of asymmetry in a shape of pulses produced by the light source, and the analyzer is configured to find the magnitude and direction of asymmetry from the output signal.

Optionally, the system also comprises the light source, and the pulses produced by the light source have full width at half maximum intensity shorter than 1 picosecond.

Optionally, the one or more characteristics comprise a complete pulse shape of pulses produced by the light source, and the analyzer is configured to find the complete pulse shape from the output signal.

Optionally, the system also includes the light source, and the light source is a pulsed light source, and one or both of the signal amplifier and the analyzer is gated so that data is used only from a time interval around each pulse, that is shorter than an interval between pulses.

Optionally, the one or more characteristics comprise a third order coherence function of the light source, and the analyzer is configured to find the third order coherence function from the output signal.

Optionally, the third order coherence function has a sensitivity for pulsed light better than 500 femtojoule per pulse at a timescale shorter than 1 femtosecond.

Optionally, the system also includes the light source, and the light source comprises a polariton laser.

Optionally, the response time of the band gap material and the signal amplifier are short enough so that the time resolution of the output signal is shorter than 1 nanosecond.

Optionally, the signal amplifier comprises a photomultiplier tube.

Alternatively, the signal amplifier comprises an avalanche photo diode.

Optionally, the system also includes a light source modulator, configured to modulate the intensity of the beam of light concentrated on the detector by a modulation frequency, and the analyzer is configured to find a component of the output signal modulated at 3 times the modulation frequency, due to three-photon absorption.

Optionally, the detector comprises an anti-reflection coating suitable for light of photon energy $E_{ph}$.

Optionally, the detector comprises a resonant cavity for light of photon energy $E_{ph}$.

Optionally, the resonant cavity comprises one or more of a photonic crystal, a Fabry-Perot cavity, and a plasmonic cavity.

There if further provided, in accordance with an exemplary embodiment of the invention, a system for measuring one or more characteristics of light of a photon energy $E_{ph}$ from a light source, that can be determined from measuring three-photon absorption, the system comprising:
  a) a detector having a band gap material characterized by gap energy between 2.1 and 3 times $E_{ph}$, comprising an anti-reflection coating suitable for light of photon energy $E_{ph}$;
  b) an optical element configured to concentrate light from the light source on the detector;
  c) a signal amplifier that amplifies an output signal indicative of when three photons produced by the light source undergo a three-photon absorption event in the band gap material, the output signal being usable for counting or measuring a rate of three-photon absorption events and determining the one or more characteristics of light from the light source.

There is further provided, in accordance with an exemplary embodiment of the invention, a method of measuring one or more characteristics of light of a photon energy $E_{ph}$ from a light source, that can be determined from measuring three-photon absorption events, the method comprising:
  a) producing light from the light source;
  b) concentrating the light on a detector having a band gap material characterized by band gap between 2.1 and 3 times $E_{ph}$;
  c) collecting an electron excited to the conduction band of the band gap material by a three-photon absorption event, caused by light from the light source;
  d) amplifying a current of the collected electron to produce an indication of the three-photon absorption event in an output signal; and
  e) analyzing the output signal to count or measure a rate of the three-photon absorption events and determine the one or more characteristics of the light from the light source.

Optionally, the light source is a pulsed light source, and the one or more characteristics comprise a magnitude and direction of asymmetry of the shape of pulses produced by the light source.

Additionally or alternatively, the one or more characteristics comprise a third order coherence function of the light source.

Additionally or alternatively, the one or more characteristics comprise a number of entangled three-photon states emitted by the light source.

Optionally, the band gap material has a thickness of at least 0.5 times a minimum of an absorption length for three-photon absorption of the light concentrated on the semiconductor detector, and a Rayleigh length for the light concentrated on the semiconductor detector.

Optionally, more than half of the power of the light concentrated on the detector falls within a spot smaller than 10 wavelengths in diameter.

There is further provided, according to an exemplary embodiment of the invention, a system for measuring one or more characteristics of light of a photon energy $E_{ph}$ from a light source, that can be determined from measuring three-photon absorption events, the system comprising:
  a) the light source;
  b) a semiconductor detector using a semiconductor with gap energy between 2.1 and 3 times $E_{ph}$;
  c) an optical element to concentrate a beam of light from the light source on the semiconductor detector; and
  d) a signal amplifier that amplifies an output signal indicative of when three photons produced by the light source undergo a three-photon absorption event in the semiconductor in the detector, the output signal being usable for counting or measuring a rate of three-photon absorption events and determining the one or more characteristics of light from the light source.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
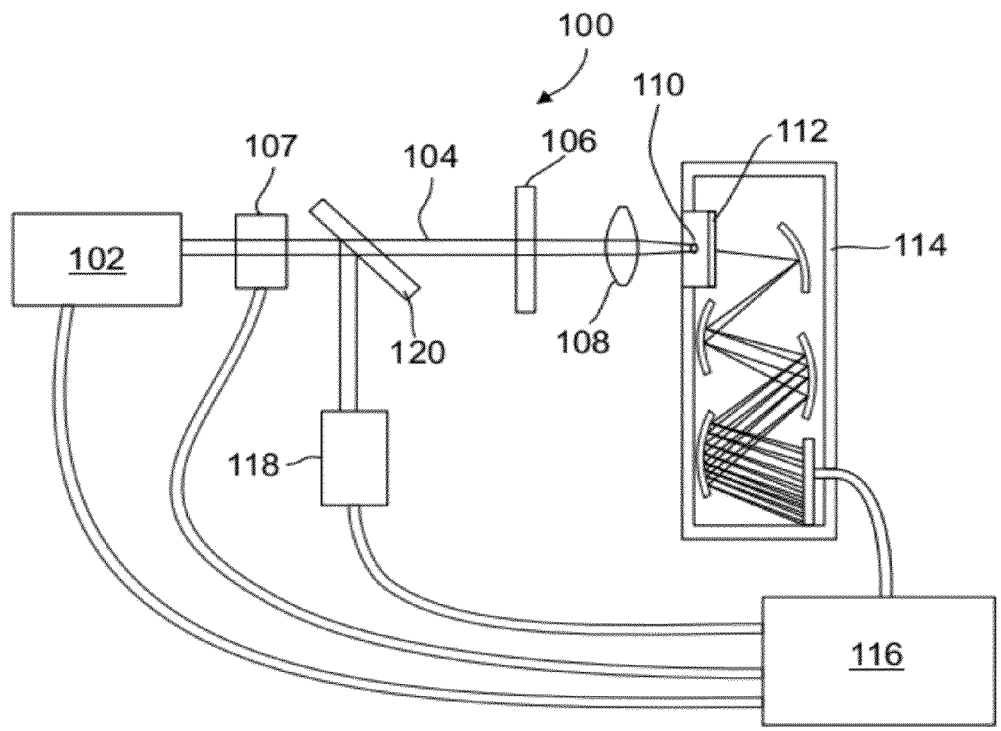
FIG. 1 is a schematic drawing of a system for characterizing the light produced by a light source, by measuring three-photon absorption with a photon counting semiconductor detector, according to an exemplary embodiment of the invention.

The present invention, in some embodiments thereof, relates to a system and method for measuring three-photon absorption events, and, more particularly, but not exclusively, to a system and method for measuring three-photon absorption rate or counting three-photon events, using a photon counting detector.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The three-photon absorption data is used to characterize the light source. In some cases, characteristics are found that cannot be obtained from measuring one-photon or two-photon absorption. Such characteristics include, for example:
1) the degree and direction of asymmetry in the shape of ultrashort pulses of light produced by the light source, as well as the complete shape of such pulses;
2) the third order coherence function $g^{(3)}(0,0)$ of light produced by the light source;
3) the number of three-photon entangled states produced by a light source of entangled photons used in quantum communications, quantum computing, quantum metrology, or quantum lithography.

Photon counting detectors for three-photon absorption may have greater sensitivity, and better time resolution, than the traditional methods used to obtain these characteristics, as described above. For example, photon counting detectors, such as semiconductor photomultiplier tubes, or avalanche photodiodes designed to run in Geiger mode, also called "single photon avalanche diodes," may be much more sensitive for measuring a rate of three-photon absorption than a semiconductor detector that is not capable of detecting individual three-photon absorption events, such as a p-i-n photodiode or an avalanche photo diode not designed to run in Geiger mode, or using coincidence measurements in three photon detectors that measure or count single-photon absorption events. Also, coincidence measurements made with three separate detectors cannot distinguish three photons that arrive simultaneously from three photons that arrive within the time resolution of the detectors, while detectors that measure three-photon absorption only respond to three photons that arrive simultaneously, within a coherence time, which may be much shorter than the time resolution of the detectors.

While three-photon absorption events are often detected with semiconductor materials, used for example as a photocathode in a photomultiplier tube, or as a photodiode in a single-photon avalanche diode, other materials with band gaps may also be used. For example, some metals with band gaps are commonly used as photocathode materials in photomultiplier tubes. In the description herein, the photocathode and photodiode materials will often be referred to, for convenience, as semiconductors, but it should be understood that other materials with band gaps may also used. The term "band gap material" is sometimes used herein, to include both semiconductors, and other materials with band gaps, that are suitable for detecting photons.

The inventors have found that photon counting detectors are advantageous over traditional photodiodes or avalanche photodiodes, that only measure rates of three-photon absorption, when pulsed sources, such as mode-locked lasers, are used, and when high sensitivity is required. If a mode locked laser produces, for example, pulses of 0.1 picosecond pulse width, at a rate of 80 MHz, which are typical values, then a photon counting detector, which may typically have a rise time of 0.1 nanoseconds, may be gated to detect only the three-photon absorption events that occur during an interval of 0.1 nanoseconds around the expected time of each pulse, and/or an analyzer may be gated to only use data from events that occur during such a time interval around the expected time of each pulse. Then all of the real three-photon absorption events will be used, but the gating will greatly reduce the noise level, because the analyzer will only use events recorded during 0.8% of the time. Optionally, the gating is on less than 10% of the time, or less than 3% of the time, or less than 1% of the time, and optionally for intervals of less than 3 nanoseconds, or less than 1 nanosecond, or less than 0.3 nanoseconds, or less than 0.1 nanoseconds, around an expected time of each pulse. This cannot be done with a typical p-i-n photodiode or ordinary avalanche photodiode, which may have a rise time much longer than the intervals between pulses, for example about 1 microsecond.

This advantage in sensitivity of photon counting detectors over rate measuring detectors, when using ultrashort pulses, has apparently not been appreciated, since conventional studies of using three-photon absorption to characterize pulse shapes, for example the paper by Langlois and Ippen cited above, have used ordinary photodiodes, such as p-i-n diodes, rather than photon counting detectors. The use of photon-counting detectors has not been considered for such applications, perhaps because they are much more expensive than ordinary photodiodes, are more bulky in the case of photo-multiplier tubes, and have a longer dead time, typically tens of nanoseconds. Such a dead time means that every time a three-photon absorption event is detected, it may be necessary to wait for several pulse intervals, before another three-photon absorption event can be detected. Nevertheless, for pulsed light sources of sufficiently low power, photon counting detectors may make measurements possible that cannot be done at all, or would take much longer, with ordinary photodiodes, due to the much great signal to noise ratio that is possible with photon-counting detectors.

It was found by the present inventors that these advantages of photon counting detectors can be obtained by a judicious selection of the characteristics of the detector, regardless of whether the data is actually recorded as individual three-photon absorption events, or as a continuous signal indicating the rate of three-photon absorption events over a time interval. In some exemplary embodiments of the invention, the data is recorded as a continuous signal indicating the rate of three-photon absorption events. Such a signal benefits from the high signal to noise ratio of photon-counting detectors. These embodiments are useful, for example, for applications such as characterizing the asymmetry of pulse shape.

Figure 4:
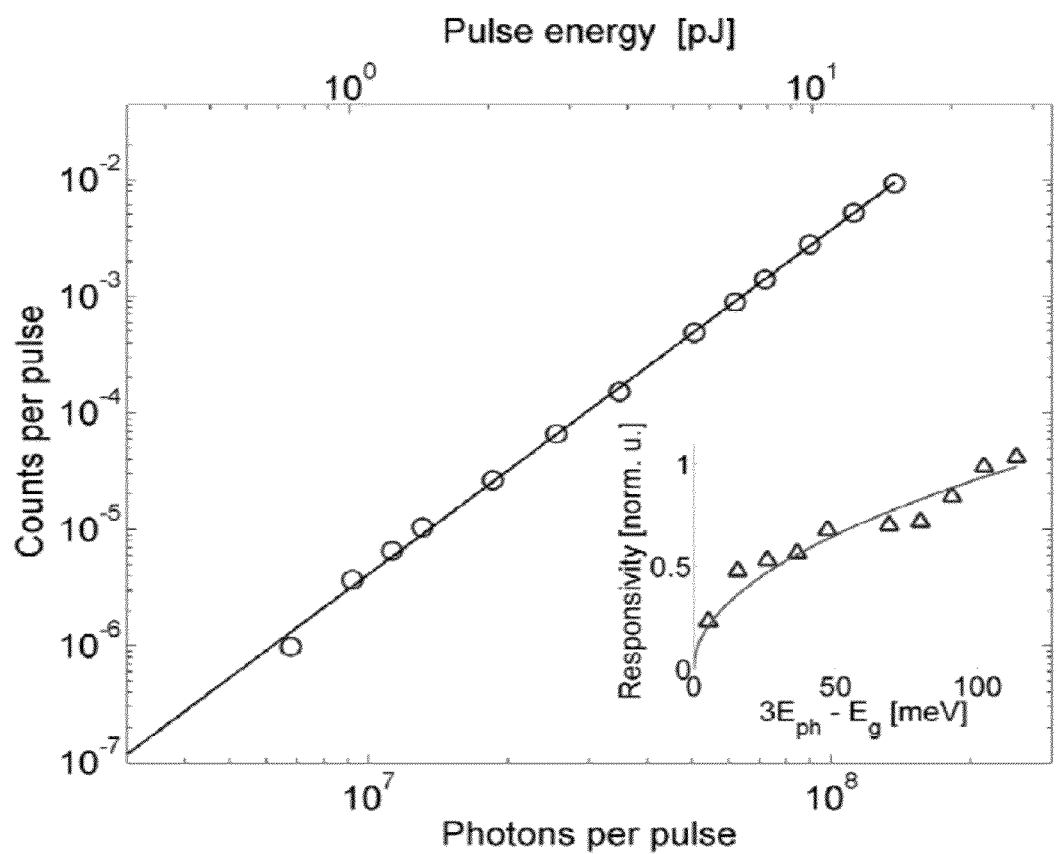
FIG. 4 is a plot of test data showing counts per pulse as a function of photons per pulse, and responsivity as a function of photon energy, in a three-photon counting experiment performed according to an exemplary embodiment of the invention.

Optionally, an optical element such as a lens is used to concentrate a beam of light from the light source onto the semiconductor detector. Concentrating the light can greatly increase the rate of three-photon absorption, which is proportional to the cube of the light intensity. The rate of three-photon absorption can also be increased, for a given time averaged light intensity, if the light source is pulsed with a short duty cycle. Some examples of counting rates, for 0.17 picosecond pulses of 1.8 µm light focused to a spot 5 µm in diameter on a photomultiplier tube with a GaAsP photocathode, are given in FIG. 4, described below in the Examples section.

Three-photon absorption in a semiconductor material occurs when three photons, with enough total energy to excite an electron from the valence band to the conduction band, interact with an electron in the semiconductor. To maximize the three-photon absorption rate for a given light intensity, most of the light produced by the light source may have photon energy of about one third of the energy gap of the semiconductor, or somewhat more. To minimize two-photon absorption in the semiconductor, which may dominate three-photon absorption if it occurs, optionally few if any of the photons produced by the light source have photon energy greater than or equal to half of the energy gap, and/or all or almost all such photons may be filtered out such that they do not reach the semiconductor. For a given light source, the semiconductor can be selected to satisfy these conditions. Broadening of the valence and conduction bands due to finite temperature and defects can also be taken into account.

According to some embodiments of the present invention, in situations in which the two-photon absorption rate is comparable to, or much (e.g., 10 times) greater than, the three-photon absorption rate, the rate for three-photon absorption is separated from the rate for two-photon absorption, by modulating the intensity of the light incident on the detector at a modulation frequency. This can be done, for example, using the technique described by Wei et al in an article entitled "High sensitivity third-order autocorrelation measurement by intensity modulation and third harmonic detection," published in Optics Letters 36, 2372-2374 (2011), the contents of which are hereby incorporated by reference. The article describes a method of measuring three-photon absorption even in the presence of two-photon absorption, by modulating the input power and looking at a component of the absorption signal modulated at the third harmonic of the input power modulation frequency.

In these embodiments, three-photon absorption is distinguished from two-photon or one-photon absorption by looking at a component of the absorption rate that varies in amplitude at 3 times the modulation frequency, and this component is attributed only to three-photon absorption.

When a three-photon absorption event occurs in the semiconductor detector, an electron, excited into the conduction band, contributes to an output current produced by the detector. In a photon counting detector, as opposed to a detector that measures a rate of three-photon absorption without counting individual events, the excited electrons are counted, using a signal amplifier such as a photomultiplier tube, or a single photon avalanche diode, to amplify each excited electron into a detectable pulse of current.

Referring now to the drawings, FIG. 1 schematically shows a system 100 for characterizing light from a light source 102, using three-photon counting. A light beam 104, produced by light source 102, optionally passes through a filter 106, which, for example, removes light that could produce one-photon or two-photon absorption. Optionally, light source 102 has an output power that is temporally modulated at a modulation frequency $\omega_m$, or a separate modulating element 107, located anywhere in the path of beam 104, modulates the power of beam 104 at a modulation frequency $\omega_m$.

The filtered beam 104 passes through an optical element 108, such as a lens, which concentrates the light in a spot 110 on a semiconductor detector 112. The semiconductor detector is part of a signal amplifier 114, such as but not limited to a photomultiplier tube or an avalanche photo diode, which amplifies the single electrons excited by three-photon absorption events into current pulses which can be counted in an output signal.

An analyzer 116, such as but not limited to a general purpose computer or dedicated circuitry, is configured to receive the output signal via a signal receiving module (not shown). Analyzer 116 records and analyzes data in the output signal to determine characteristics of the light source. The analysis typically includes counting the individual three-photon absorption events, but analyzers configured for measuring a rate of three-photon absorption events in addition or as an alternative to the counting are not excluded from the scope of the present invention.

Optionally, a light detector 118 monitors the intensity of light beam 104 directly, for example using a portion of light beam 104 taken off by a beam splitter 120, and light detector 118 communicates its own output signal to analyzer 116. Optionally, analyzer 116 also receives data from light source 102, for example on the timing of pulses if light source 102 is pulsed, and/or analyzer 116 controls the timing of pulses or other aspects of the operation of light source 102.

Optionally, analyzer 116 only records data from signal amplifier 114, during a time interval around each pulse of the light source, during which three-photon absorption events are expected. For example, the time interval is about 1 picosecond, or about 3 picoseconds, or about 10 picoseconds, or about 30 picoseconds, or about 100 picoseconds, or about 300 picoseconds, or about 1 nanosecond. It may be advantageous to make the time interval about equal to the greater of the time resolution of the detector, and the pulse width. Typically the time resolution of the detector is greater than the pulse width, but shorter than the time between pulses.

When light beam 104 is modulated at a frequency $\omega_m$, analyzer 116 optionally finds a component of the rate of absorption events, from the output signal, that is modulated at a frequency $3\omega_m$, in order to separate a portion of the rate of absorption events that is due to three-photon absorption in detector 112, from a portion of the rate of absorption events that may be due to other processes, such as one-photon or two-photon absorption, since only the rate of three-photon absorption events is expected to be modulated at $3\omega_m$. The portion of the rate of absorption events due to three-photon absorption may be estimated, as described in Wei et al, cited above, from the observed $3\omega_m$ modulation amplitude in the rate of absorption events detected, the known modulation amplitude in the intensity of light beam 104, and the fact that the three-photon absorption rate is expected to be proportional to the cube of the light intensity, for an unsaturated detector.

Figure 2:
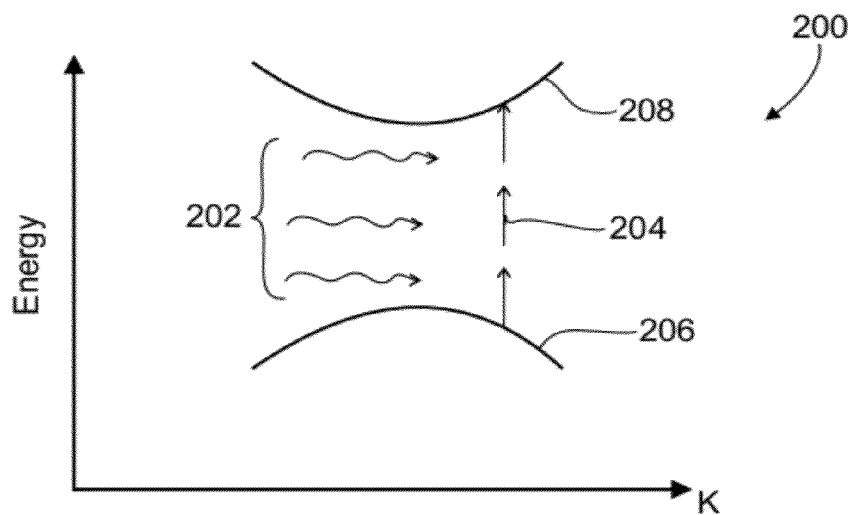
FIG. 2 schematically shows the band structure of a direct band semiconductor, such as might be used in the semiconductor detector of FIG. 1, according to an exemplary embodiment of the invention.

FIG. 2 shows a schematic plot 200 of the band structure of the semiconductor material in detector 112, according to some embodiments of the present invention. A triplet of three photons 202 excites an electron 204 from valence band 206 to conduction band 208. The total energy of the three photons is equal to the band gap energy $E_g$ between the valence band and conduction band, for some value of the momentum k, represented by the horizontal axis of plot 200. Plot 200 shows the band structure for a direct band semiconductor such as, but not limited to, GaAs, with the minimum energy of the conduction band occurring at the same momentum as the maximum energy of the valence band. However, this need not necessarily be the case, since, for some applications, it may not be necessary for the semiconductor to be a direct band semiconductor, since in some embodiments a semiconductor with an indirect band structure such as, but not limited to, silicon is used.

Generally, the present embodiments contemplate semiconductor materials suitable for light detection for three-photon counting. A representative example includes without limitation, organic semiconductors, which may be suitable. The choice of semiconductor material for detector 112 depends on the distribution of photon energies being used. Typically, the semiconductor material of detector 112 has a substantial three-photon absorption rate for at least some photon energies in the distribution, but optionally has negligible one-photon and two-photon absorption for any photon energies present to a significant degree. For example, in some embodiments of the present invention, the light intensity on the semiconductor material of detector 112 is sufficiently great, and the spectrum falls off sufficiently rapidly with increasing energy at photon energies within a few kT of half the gap energy $E_g$ (where k is Boltzmann's constant and T is the temperature), that more than 50% of the absorption events are three-photon absorption events, or more than 80% are three-photon absorption events, or more than 90% are three-photon absorption events, or more than 95% are three-photon absorption events. The rates for one-photon, two-photon, and three-photon absorption, as they depend on the light intensity, are given by Eq. (1) in the Examples section below, in terms of the one-photon, two-photon and three-photon absorption coefficients $\alpha$, $\beta$, and $\gamma$. Data and theoretical expressions for the two- and three-photon absorption coefficients $\beta$ and $\gamma$ are given for GaAs, for example, by W. C. Hurlbut et al, "Multiphoton absorption and nonlinear refraction GaAs in the mid-infrared," Optics Letters 32, 668-670 (2007). Their data show $\beta$=2.5 cm/GW at a wavelength of 1.68 μm, and $\gamma$=0.35 cm$^3$/GW$^2$ at a wavelength of 2.30 μm. In the case of 1 mW continuous wave power of light concentrated into a spot of area of 1 (μm)$^2$, which is approximately the diffraction limit, the ratio of two-photon absorption rate at a wavelength of 1.68 μm to three-photon absorption rate at a wavelength of 2.30 μm would be about 10$^5$, so the spectrum would have to fall off by more than a factor of 10$^5$ from 2.30 μm to 1.68 μm, considering only those two wavelengths, in order to have more than 50% of the absorption events due to three-photon absorption. It will apparent to one of skill in art, how to make such a calculation taking the full spectrum into account, and for other spot sizes, light powers, and materials.

Optionally, the semiconductor material is selected based on the type of signal amplifier being used. For photomultiplier tubes, for example, a photocathode material such as, but not limited to, GaAs is used. Various semiconductors, including silicon and GaAs, are used in avalanche photodiodes.

Other photocathode materials suitable for photomultiplier tubes, include CsI, CsTe, SbCs, bialkali materials such as SbRbCs, SbKCs, SbNaK, multialkali materials such as SbNaKCs, AgOCs, HgCdTe, HgZnTe, GaAsP optionally activated with Cs, GaAs optionally activated with Cs, InGaAs optionally activated with Cs, and field assisted photocathode materials such as InP/InGaAsP and InP/InGaAs, also optionally activated with Cs.

In various exemplary embodiments of the invention the semiconductor photodiode material is a III-V semiconductor alloy, namely an alloy or compound which comprises at least one element from group III of the periodic table and at least one element from group V of the periodic table. Exemplary useful group-III elements include, but are not limited to, gallium, indium, thallium and aluminum; and exemplary useful group-V elements include, but are not limited to, arsenic, antimony and phosphorous Non-limiting examples of III-V semiconductor alloys suitable for the present embodiments include binary III-V semiconductor alloys, such as, but not limited to, InAs, InSb, InP GaSb, GaAs and AlSb, ternary III-V semiconductor alloys such as, but not limited to, InGaAs, InAsSb, InAsP, AlInAs, AlAsSb, GaAsP and InSbP, and quaternary semiconductor alloys such as, but not limited to, GaInAsSb.

Some II-IV alloys or compounds, comprising at least one element from group II and at least one element from group IV of the periodic table, may also be used as band gap materials for three-photon absorption.

The light from light source 102 can efficiently produce three-photon absorption events in the semiconductor if the photons it emits mostly have an energy $E_{ph}$ equal to about ⅓ of the band gap energy $E_g$ of the semiconductor. A semiconductor with band gap energy $E_g$ can also be used to measure three-photon absorption events from a light source with a broader emission spectrum, since three photons of different energies, adding up to $E_g$, can also produce three-photon absorption. However, if there are a significant number of photons with energy equal to or greater than half of the gap energy $E_g$ reaching the semiconductor, then two-photon absorption may be the dominant process in the semiconductor, rather than three-photon absorption. For these reasons, to use three-photon absorption to measure characteristics of a light source that emits photons predominantly with energy $E_{ph}$, it may be advantageous to use a semiconductor with gap energy close to but not higher than $3E_{ph}$, and well above $2E_{ph}$. For example, the gap energy is greater than $2.1E_{ph}$, or greater than $2.2E_{ph}$, or greater than $2.5E_{ph}$, or greater than $2.8E_{ph}$. It may also be advantageous to have few if any photons reaching the semiconductor, from the light source or from any background source of light, with energy greater than half the gap energy, or even with energy close to half the gap energy, to avoid having one-photon or two-photon absorption contribute significantly to the signal. Due to finite temperature of the semiconductor, and defects in the semiconductor, both the valence band and the conduction band may have finite width in energy, so that even photons with energy slightly less than half of the gap energy may be able to produce some two-photon absorption, and even photons with slightly less than one third of the gap energy may be able to produce some three-photon absorption. Because of this band broadening, the system in some embodiments of the invention avoids photons of energy not only above half the gap energy, but even of energy less than but close to the gap energy, for example greater than 0.49 times the gap energy, or greater than 0.48 times the gap energy, or greater than 0.45 times the gap energy, or greater than 0.4 times the gap energy. Also because of this band broadening, there may be some three-photon absorption even if the gap energy is slightly greater than $3E_{ph}$, for example $3.1E_{ph}$ or $3.2E_{ph}$. But in some embodiments of the invention, the gap energy is no greater than $3E_{ph}$, and it is believed that the three-photon absorption rate may be greater, and the system may therefore produce a stronger signal, in that case.

Optionally, to produce a stronger three-photon absorption rate for a given light intensity, the emission spectrum of the light is fairly narrow, for example with a full width half maximum of less than 20% of $E_g$, or less than 10% of $E_g$, or less than 5% of $E_g$, or less than 2% of $E_g$, and centered at $E_g/3$, or with $E_g/3$ within the full width half maximum of the peak.

When the gap energy is from about 1 to about 3 eV, which is a typical value for semiconductors, such as, but not limited to, silicon and GaAs, three-photon absorption occurs with photons in the near infrared, for example with wavelength from about 1 to about 2 micrometers. Semiconductors such as, but not limited to, InGaAs and germanium, with smaller gap energy, which are capable of one-photon absorption in the near infrared, are suitable according to some embodiments of the present invention for three-photon absorption at longer infrared wavelengths, for example from about 3 to about 5 micrometers.

To improve the three-photon absorption rate, the light beam may, in some embodiments of the present invention, be focused, e.g., by optical element 108, to a relatively small spot on the semiconductor, for example a spot less than 20 wavelengths wide, or less than 10 wavelengths wide, or less than 5 wavelengths wide, or less than 3 wavelengths wide, for the peak wavelength being used. Optionally, the spot is less than 20 micrometers in diameter, or less than 10 micrometers, or less than 5 micrometers, or less than 3 micrometers. Also to increase light intensity, the lens or other optical element focusing light has a relative high numerical aperture, for example higher than 0.2, or higher than 0.3, or higher than 0.4, or higher than 0.5. Although using greater numerical aperture also reduces the Rayleigh length, and hence the depth of the semiconductor over which the light is close to its maximum intensity, the higher intensity at higher numerical aperture may more than make up for the smaller depth, resulting in a greater total rate of three-photon absorption events.

Optionally, the thickness of the semiconductor in the detector is at least as great as the minimum of the Rayleigh length for the light beam, and the absorption length for three-photon absorption in the semiconductor. This is the depth into the semiconductor within which most three-photon absorption events take place, since the light intensity falls off substantially at greater depths. Making the semiconductor at least this thick may substantially increase the rate of three-photon absorption events over what would occur if the semiconductor were much thinner. Alternatively, the semiconductor thickness is at least 0.5 times the minimum of the Rayleigh length and the absorption length, or at least 0.2 times the minimum, or at least 2 times the minimum. In some embodiments of the invention, the semiconductor includes an active layer, where three-photon absorption events are detected, lying over an inactive substrate, often much thicker than the active layer, and in this case it is optionally the active layer thickness that is at least 0.5 times the minimum of the Rayleigh length and the absorption length, or at least 0.2 times the minimum, or at least 2 times the minimum. In a detector designed for single-photon absorption, the absorption length is often about 1 micrometer, much less than the Rayleigh length, which is often tens of micrometers, so the active layer is often made only a few micrometers thick. But for three-photon absorption, the absorption length is typically greater than the Rayleigh length, and it may be advantageous, in a detector designed for three-photon absorption, to make the active layer thicker, for example at least 3 micrometers thick, or at least 10 micrometers, or at least 30 micrometers, or at least 100 micrometers, or greater, smaller, or intermediate values.

In embodiments in which the semiconductor is a photocathode in a photomultiplier tube, the semiconductor thickness is optionally no greater than the diffusion length of electrons in the conduction band of the semiconductor. If the semiconductor is thicker than this, then a substantial fraction of the electrons, excited to the conduction band by three-photon absorption, will recombine with a hole before they are emitted from the photocathode. Alternatively, the semiconductor thickness is at most 0.2 times the diffusion length, or at most 0.5 times the diffusion length, or at most 2 times the diffusion length.

The three-photon absorption rate is also increased, for a given average power of the light source, if the light source is pulsed, with a small duty cycle. For example, the duty cycle is less than $10^{-1}$, or less than $10^{-2}$, or less than $10^{-3}$, or less than $10^{-4}$, or less than $10^{-5}$, or less than $10^{-6}$.

Optionally, system 100 has a sensitivity of better than 0.5 picojoule per pulse for pulsed light, or less than 0.5 picojoule per coherence time. This sensitivity was achieved for the three-photon counting system described below in the Examples section, with 1.8 to 1.9 μm light focused down to a spot 5 μm in diameter, using an off-the-shelf photomultiplier tube with a GaAsP photocathode, with 0.17 picosecond wide pulses, with coherence time comparable to the pulse width. Optionally the sensitivity is better than 3 picojoules per coherence time, or better than 1 picojoule, or better than 0.3 picojoules, or better than 0.1 picojoules, or better than 30 femtojoules, per coherence time.

In various exemplary embodiments of the invention a photomultiplier tube or an avalanche photo diode, for example a SPAD, designed for three-photon absorption is employed.

In some embodiments of the present invention the distance between the window of the photomultiplier tube and the photocathode is selected to allow the light to be focused into a smaller spot. Optionally, the distance between the window and the photocathode is less than 5 mm, or less than 2 mm, or less than 1 mm, or less than 0.5 mm, or less than 0.2 mm, or less than 0.1 mm. Optionally, the lens focusing the light is built into the window.

In some embodiments of the present invention the photomultiplier tube or avalanche photodiode comprises an anti-reflection coating designed for the wavelengths used for three-photon absorption, for example for photon energies greater than ⅓ but less than half of the gap energy.

In some embodiments of the present invention the thickness of the photomultiplier tube photocathode, or the active layer of the semiconductor of the avalanche photodiode, is greater than the Rayleigh length and/or the absorption length, for wavelengths used for three-photon absorption.

In some embodiments of the present invention a modulation process is employed, as described, for example, in Wei et al, described above.

In some embodiments of the present invention with a pulsed light source, the detector or the analyzer only measures three-photon absorption events occurring in narrow time intervals around the expected pulse times.

In some embodiments of the present invention the photocathode or photodiode has a relatively small active detector area, to take advantage of a relatively small size of the spot of light focused on it, since the part of the active detector area not exposed to the light produces noise without producing signal. Optionally, the active surface area of the photocathode is less than $(3 \text{ mm})^2$, or less than $(1 \text{ mm})^2$, or less than $(0.3 \text{ mm})^2$, or less than $(0.1 \text{ mm})^2$, or less than $(30 \text{ μm})^2$.

In some embodiments of the present invention the photomultiplier tube or avalanche photodiode is operated at temperature less than 300 K, or less than 273 K, or less than 250 K, or less than 200 K, or less than 150 K, or less than 100 K.

In some embodiments of the present invention the photomultiplier tube comprises a photocathode material, or the avalanche photodiode comprises a detector material, chosen for a three-photon absorption coefficient of at least 0.3 $cm^3/GW^2$, or at least 0.5 $cm^3/GW^2$, or at least 0.7 $cm^3/GW^2$, or at least 1.0 $cm^3/GW^2$, or at least 1.5 $cm^3/GW^2$, or at least 2 $cm^3/GW^2$.

In some embodiments of the present invention the photocathode comprises cavities for narrow bandwidths (e.g, bandwidths less than 10% of the peak photon energy) of incident light. Representative examples include, without limitation, photonic crystals or a Fabry-Perot cavity.

In some embodiments of the present invention the photocathode comprises cavities for wide bandwidths (e.g., bandwidths above 10% of the peak photon energy) of incident light. Representative examples include, without limitation, plasmonic cavities.

Optionally, the combination of semiconductor 112 and signal amplifier 114 allows three-photon absorption events to be recorded with a time resolution of better than 10 nanoseconds, or better than 3 nanoseconds, or better than 1 nanosecond, or better than 300 picoseconds, or better than 100 picoseconds, or better than 30 picoseconds, or better than 10 picoseconds, or better than 3 picoseconds.

Optionally the semiconductor has an anti-reflection coating, designed to reduce reflection of light having the wavelength of most of the photons participating in three-photon absorption, or having an energy equal to about ⅓ of the gap energy. For example, the anti-reflection coating can have a thickness between 0.4 and 0.6 of a wavelength for light of photon energy equal to ⅓ of the gap energy, or between 0.45 and 0.55 of this wavelength.

Measuring Asymmetry of Ultrashort Pulses

Figure 3A:
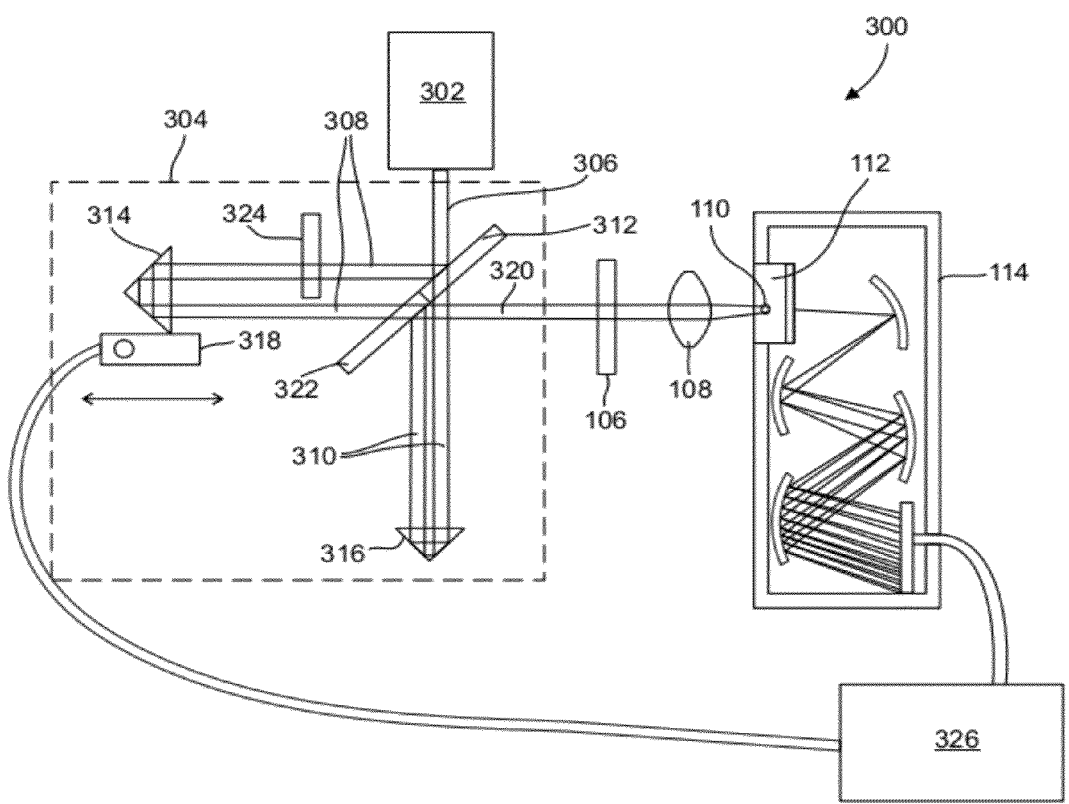
FIG. 3A is a schematic drawing of a system for measuring a degree and direction of asymmetry of the shape of ultrashort light pulses, as well as for measuring third order coherence of a light source, using an autocorrelation interferometer with a system similar to that in FIG. 1, according to an exemplary embodiment of the invention.

FIG. 3A schematically shows a system 300 that can be used, among other purposes, for measuring a degree and direction of asymmetry in the shape of ultrashort pulses produced by a light source 302, for example pulses shorter, in full width at half maximum of the intensity, than 1 picosecond, or shorter than 300 femtoseconds, or shorter than 100 femtoseconds, or shorter than 30 femtoseconds, or shorter than 10 femtoseconds. Such pulses are far too short for their shape to be measured directly by light detectors, which typically have a time resolution ranging from picoseconds to nanoseconds, but they have many applications for which it is desired to measure their shape, including their asymmetry.

Such applications include, for example, fiber optic communications, in which pulses may undergo chromatic dispersion in optical fibers, and knowing the shape of the light pulse, before and/or after passing through a fiber, may make it possible to monitor chromatic dispersion to keep it within certain limits, or to design techniques for changing chromatic dispersion.

Other applications of ultrashort pulses, for which it is desired to measure the pulse shape including the asymmetry, include, for example, microscopy and one-shot spectroscopy, in which light pulses may travel through an optical medium on the way to and from a sample that is being observed, and the medium may change the pulse shape. Knowing the pulse shape before and/or after the pulse passes through the medium makes it possible to monitor the light source to make sure it is producing pulses of a desired shape, as well making it possible to adjust the initial pulse shape to compensate for changes in the medium, and making it possible to take the pulse shape into account in analyzing the data, allowing more accurate microscopic images or spectra for example.

In some embodiments of the present invention system 300 comprises a device that splits and rejoins light beams with a controllable relative time delay, for example a Michelson interferometer 304 that splits a light beam 306 from light source 302 into two beams 308 and 310, using a splitting element 312, for example a partially silvered mirror, or a polarizing beam splitter. The two beams are reflected back from two reflecting elements 314 and 316, for example mirrors or retroreflectors, at the ends of the two arms of interferometer 304. At least one of the reflecting elements, 314 in the case shown in FIG. 3, can be moved with an actuator 318, for example a piezo-electric motor, so that the paths taken by the split beams 308 and 310 can be different lengths, and the relative lengths of the two paths can be adjusted. The range over which the lengths can be adjusted is such that either the path of beam 308 or the path of beam 310 can be longer, and the difference in path length can vary over a distance corresponding at least to the spatial width of the pulses being measured.

Additionally or alternatively, any other method known in the art is used to produce a controllable relative time delay between beams 308 and 310, optionally without producing any significant distortion in the pulses.

After reflecting from reflecting elements 314 and 316 and undergoing time delays that may be different for the two beams due to their different path lengths, beams 308 and 310 are optionally joined into a combined beam 320 using a joining element 322, for example another partially silvered mirror, optionally the same as splitting element 312, and are detected using three-photon counting, using a semiconductor detector 112 in a signal amplifier 114, which detects three-photon absorption events.

In embodiments in which elements 312 and 322 are polarizing beam splitters, one or both of beams 308 and 310, depending on the geometric configuration of the interferometer arms and the detector, optionally passes through a polarization-changing element, such as a Faraday rotator, not shown, so that when beams 308 and 310 join again in joining element 322, the joined beam be directed toward detector 112.

Alternatively, beams 308 and 310 are not joined by a joining element, but are directed to largely overlapping locations on detector 112, and only join there. When beams 308 and 310 are joined, they are optionally very different in amplitude, due to splitting element 312 splitting beam 306 unevenly, or due to joining element 322 taking different fractions of the power in the two beams when joining them, or due to at least one of reflecting elements 314 and 316 reducing the intensity of the beam reflecting from it, or due to an attenuating element 324, optionally controllable, in the path of at least one of beams 308 and 310, or due to any combination of these things. For example, the intensities of the two beams can differ by a factor of 5, or 10, or 20, or 50, or any greater, smaller, or intermediate value. In embodiments in which system 300 is used to measure pulse asymmetry, the two beams optionally and preferably have different amplitudes. In other embodiments, such as, but not limited to, measuring third order coherence as described below, the two beams need not have different amplitudes.

An analyzer 326 receives counting data from signal amplifier 114. The procedure is optionally and preferably repeated with different values of the path length difference between beams 308 and 310. Optionally, analyzer 326, or a separate controller, changes the difference in the path length by communicating with actuator 318, and records the difference in path length each time it records data on the number of three-photon absorption events from signal amplifier 114. Analyzer 326, or a separate analyzer, then uses the data on the three-photon counting rate as a function of path difference, to find characteristics of the shape of the pulse, including the asymmetry in shape.

In some embodiments of the present invention, the pulse shape is found as follows, using a method similar to that described by Langlois and Ippen, cited above, but using a photon counting detector to measure three-photon absorption, rather than a photodiode that only measures a three-photon absorption rate and is not capable of counting individual events. When beams 308 and 310 have a time delay $\tau$ between them, with beam 308 having a shorter path length when $\tau>0$ and beam 310 having a shorter path length when $\tau<0$, and the pulse shape as a function of time t is I(t), then the intensity of the pulses in the combined beam as a function of time will be $aI(t+\tau/2)+bI(t-\tau/2)$, where a and b are, respectively, the intensities of beams 308 and 310.

For simplicity of presentation, an interference term, which depends on the phase difference between the two paths and is a rapidly oscillating function of $\tau$, is neglected. One of ordinary skill in the art, provided with the details described herein would know how to include the contribution of interference term. The three-photon absorption rate is proportional to the cube of the intensity, and when averaged over time t is:

$$(a^3+b^3)\int dt\, I^3(t)+3a^2b\int dt\, I^2(t+\tau/2)I(t-\tau/2)+3ab^2\int dt\, I^2(t-\tau/2)I(t+\tau/2)$$

The first term is independent of $\tau$, and the other two terms, as a function of $\tau$, can be used to find the pulse shape I(t), as long as a≠b, including any time asymmetry in the shape of I(t). Note that any time asymmetry in the shape of I(t) cannot be found if two-photon absorption is used instead of three-photon absorption, since then the counting rate will be proportional to the square of the intensity, and the term dependent on $\tau$ will be $2ab\int dt\, I(t+\tau/2)I(t-\tau/2)$ which is symmetric with respect to changing the sign of $\tau$. With three-photon absorption, it is possible to detect an asymmetry in the pulse shape, and to determine the degree of asymmetry, defined herein as the magnitude and direction of the asymmetry.

For some applications, it may be desired to know the shape of the pulses, rather than only characterizing them by a width and a degree of asymmetry. For example, the complete pulse shape may be needed in order to evaluate the transfer function of an optical system, or in order to design an optical fiber that takes an input pulse of that shape and generate the shortest possible output pulse.

Figure 3B:
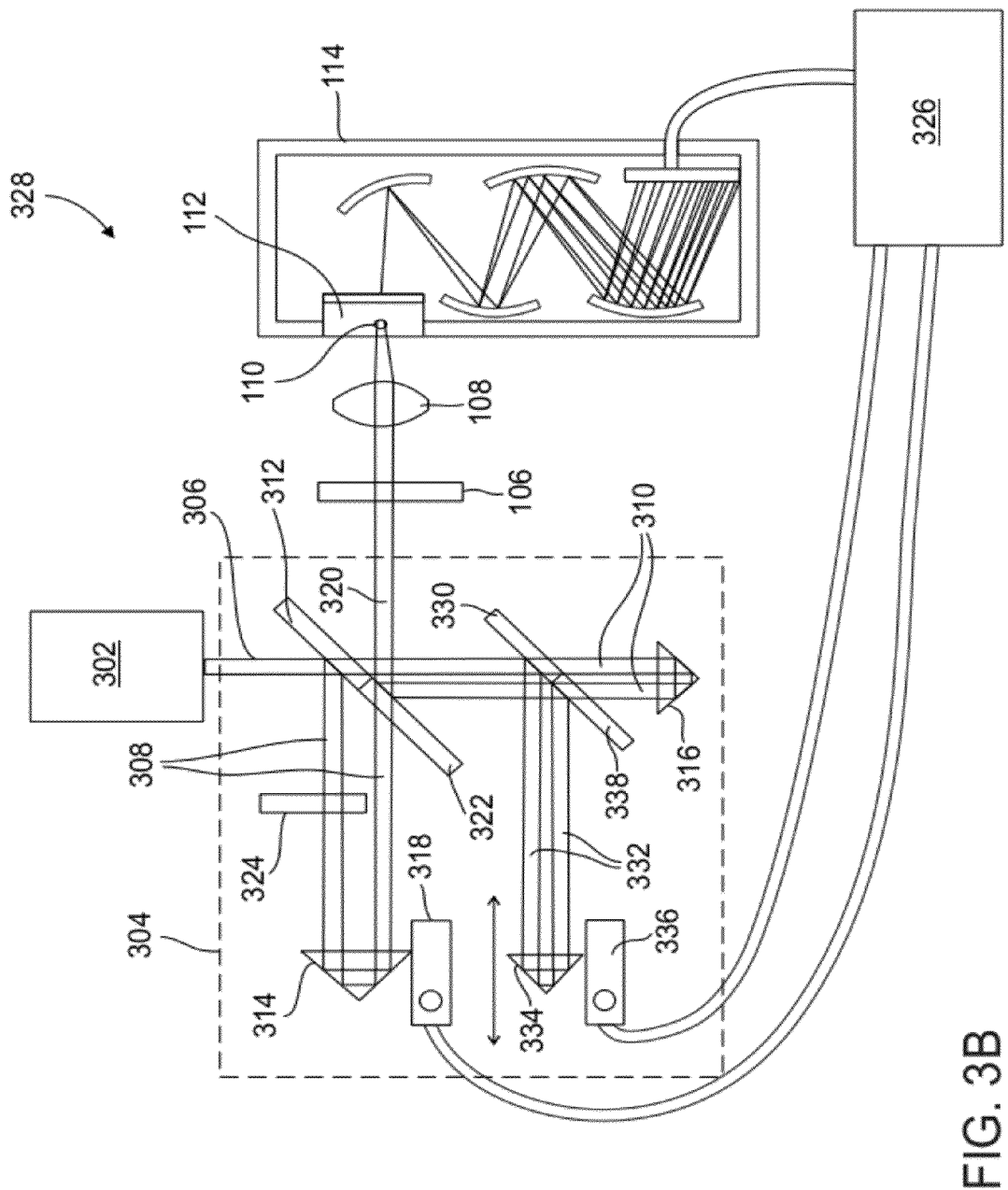
FIG. 3B is a schematic drawing of a system for measuring the complete shape of ultrashort light pulses, similar to the system in FIG. 3A but using an autocorrelation interferometer with three beams and two time delays, according to an exemplary embodiment of the invention.

The pulse shape may be found using a system 328 shown in FIG. 3B. System 328 is similar to system 300 in FIG. 3A, but uses three beams, with two relative time delays $\tau_1$ and $\tau_2$, to measure the three-photon absorption rate as a function of $\tau_1$ and $\tau_2$. This may be done, for example, by using an additional beam splitting element 330, which splits off an additional beam 332 from one of the split beams, for example beam 310, and sends it along a third interferometer arm. Alternatively, a single splitting element splits beam 306 into three beams. An additional reflecting element 334, with position that can be adjusted by an actuator 336, is located at the end of the third interferometer arm, and changes the path length of beam 332 to produce a time delay $\tau_2$ in beam 332, relative to beam 310, that is controllable independently of a time delay $\tau_1$ of beam 308 relative to beam 310.

Additionally or alternatively, any other means known in the art is used to produce time delay $\tau_1$ of beam 308 and time delay $\tau_2$ of beam 332, optionally without producing any significant distortion in the pulses. Optionally, analyzer 326 controls the time delays by communicating with actuators 336 and 318, or with any other mechanism that is used to produce a relative time delay between the different split beams. Optionally, analyzer receives data from actuators 336 and 318, or any other mechanism used to produce the time delays, telling analyzer 326 the values of the time delays. Beam 332 optionally joins beam 310 using a joining element 338, after returning from reflecting element 334. Optionally joining element 338 is the same as splitting element 330. Alternatively, beam 332 joins beam 308, or joins beam 320, or all three beams are joined with a single joining element. Optionally, as in system 300, one or more of the splitting elements and joining elements is a polarizing beam splitter, and polarization changing elements in the path of one or more of the beams change the polarization if necessary to direct the joined beam in the proper direction. Alternatively, any two of the beams, or all three beams, are not joined by a joining element, but are directed to largely overlapping locations on detector 112, and only join there. Optionally, any of the methods described for changing the relative intensity of the two split beams in system 300, are also used for changing the relative intensity of the three split beams in system 328, including using additional attenuators, optionally controllable, in the paths of any of the beams.

As in system 300, analyzer 326 is used to find characteristics of the pulse shape from the data produced by signal amplifier 114. The following exemplary method may be used to find the complete pulse shape using system 328. The total pulse intensity as a function of time reaching semiconductor detector 112, from the three joined beams, is given by $aI(t)+bI(t+\tau_1)+cI(t+\tau_2)$, where a, b, and c are respectively the intensities of beams 310, 308, and 332, and I(t) is the pulse shape. The three-photon absorption rate is taken to be proportional to the cube of the total intensity, and the measured absorption rate is averaged over the time t, effectively from $-\infty$ to $+\infty$, appropriate if the pulse width is much shorter than the time resolution of the detector. The measured three-photon absorption rate would then be proportional to $$(a^3+b^3+c^3)G^{(3)}(0,0)+3a^2bG^{(3)}(0,\tau_1)+3ab^2G^{(3)}(0,-\tau_1)+3a^2cG^{(3)}(0,\tau_2)+3ac^2G^{(3)}(0,-\tau_2)+3b^2cG^{(3)}(0,\tau_2-\tau_1)+3bc^2G^{(3)}(0,\tau_1-\tau_2)+6abcG^{(3)}(\tau_1,\tau_2)$$

where $G^{(3)}(\tau_1, \tau_2)$ is the triple autocorrelation function $$G^{(3)}(\tau_1,\tau_2)=\int_{-\infty}^{+\infty} dt\, I(t)I(t+\tau_1)I(t+\tau_2)$$

By measuring the three-photon absorption rate with only one beam, $G^{(3)}(0,0)$ may be found, and $G^{(3)}(0,\tau)$ may be found by measuring the three-photon absorption rate with two split beams of intensity a and b, and time delay $\tau$, using various values of $\tau$ and at least two different ratios of a and b. Once $G^{(3)}(0,0)$ and $G^{(3)}(0,\tau)$ are known, the full triple autocorrelation function $G^{(3)}(\tau_1, \tau_2)$ may be found by measuring the three-photon absorption rate using three split beams with various values of the time delays $\tau_1$ and $\tau_2$, subtracting the $G^{(3)}(0,0)$ and $G^{(3)}(0,\tau)$ terms from the above expression for the three-photon absorption rate. The full triple autocorrelation function $G^{(3)}(\tau_1, \tau_2)$ may then be used to find the complete pulse shape I(t), for example using the method described by Feurer, Niedermeier, and Sauerbrey, cited above. If it is also desired to find the frequency (color) and/or phase of the light, as a function of time t within a pulse, then the method described by Liu et al, cited above, may be used, for example.

Measuring Third Order Coherence of a Light Source

It is sometimes useful to find the third order coherence of a light source. Such a situation is described, for example, by Hirokiri et al, cited above, in characterizing a polariton laser, which has a third order coherence function $g^{(3)}(0,0)$ that is different from an ordinary laser, a thermal (blackbody) source, or a pure photon number state. In designing or operating a polariton laser, measuring the third order coherence function may be useful. Hirokiri et al describe doing this using coincidence measurements with three single-photon detectors, but it was found by the present inventors that this method cannot distinguish $g^{(3)}(0,0)$ from $g^{(3)}(\tau_1, \tau_2)$ at values of $\tau_1$ and $\tau_2$ that are shorter than the time resolution of the detectors, at best a few picoseconds, and much worse for less expensive detectors.

Measuring the three-photon absorption rate with a single three-photon counting detector according to some embodiments of the present invention allows $g^{(3)}(0,0)$ to be measured more accurately, because three-photon absorption does not occur unless the photons are present simultaneously, within a coherence time, even down to femtosecond timescales. Another potential advantage of three-photon absorption of the present embodiments for these measurements is that single-photon absorption may be inefficient for infrared photons. The third order coherence function $g^{(3)}(\tau_1, \tau_2)$ is a normalized version of the triple autocorrelation function $G^{(3)}(\tau_1, \tau_2)$ defined above.

System 300 may optionally be used to find the third order coherence function $g^{(3)}(0,0)$ for light source 302 whether it is pulsed or continuous. The general third order coherence function $g^{(3)}(\tau_1, \tau_2)$ may be defined as $$g^{(3)}(\tau_1, \tau_2) = \frac{\langle I(t)I(t+\tau_1)I(t+\tau_2)\rangle}{\langle I(t)\rangle^3}$$

where the averages are over time t. Then $g^{(3)}(0,0)$, which Hirokiri et al, cited above, refer to as $g^{(3)}(0)$, is equal to $\langle I^3(t)\rangle\langle I(t)\rangle^{-3}$, which is proportional to the three-photon absorption rate that would be obtained by system 300 if the time delay $\tau$ between beams 308 and 310 were set to zero. To find $g^{(3)}(0,0)$, the three-photon absorption rate is found with the time delay $\tau$ set to zero, which is equal to $(a+b)^3 g^{(3)}(0,0)$ (where a and b are the intensities of beams 308 and 310) times a normalization factor. The normalization factor may be found by measuring the three-photon absorption rate with the time delay $\tau$ set to several large values, much greater than any expected coherence time for the light source, but short compared to the duration of the pulses, in the case of a pulsed light source.

The intensities a and b of beams 308 and 310 need not be different from each other, as they are when measuring the asymmetry of a pulse, although they can be different from each other. To eliminate the effect of the interference term in the intensity of the combined beam 320, due to the phase difference between the path length of beams 308 and 310, the three-photon absorption rate may be measured for several different large values of $\tau$, representing for example a uniform distribution of phase differences between the two path lengths. The three-photon absorption rate is then averaged over the phase difference. The result equals the same normalization factor times $(a^3+b^3)g^{(3)}(0,0)+3ab(a+b)g^{(2)}(0)$, where $g^{(2)}(\tau)$ is the second order coherence function. Then the ratio of the three-photon absorption rate averaged over phase difference at large $\tau$, to the three-photon absorption rate with $\tau=0$, can be written as:

$$(a^3+b^3)(a+b)^{-3}+3ab(a+b)^{-2}g^{(2)}(0)/g^{(3)}(0,0)$$

Knowing $g^{(2)}(0)$, a and b, this ratio can be used to determine $g^{(3)}(0,0)$. The second order coherence function $g^{(2)}(0)$ may be found, for example, by measuring the two-photon absorption rate for the same light source, using a different semiconductor for which the gap energy is about twice the photon energy, and taking the ratio of the absorption rate averaged over phase difference at large $\tau$, to the absorption rate at $\tau=0$, which can be written as:

$$(a^2+b^2)(a+b)^{-2}+2ab(a+b)^{-1}/g^{(2)}(0)$$

Alternatively, the normalization factor may be found more directly by measuring the three-photon absorption rate in an interferometer, such as system 328, in which the beam from the light source is split into three parts, with the second and third beams given delays of $\tau_1$ and $\tau_2$ relative to the first beam. Then $g^{(3)}(0,0)$ can be found by measuring the three-photon absorption rate with $\tau_1$ and $\tau_2$ both equal to zero, and dividing by the three-photon absorption rate found using several values of $\tau_1$ and $\tau_2$ that are both large compared to the expected coherence time of the light source, and averaging over phase difference.

Alternatively, $g^{(3)}(0,0)$ can be found by measuring the three-photon absorption rate using system 100, and calculating the normalization factor by measuring the intensity of light on the surface of the semiconductor, and carefully modeling the three-photon absorption rate in terms of the light intensity, taking into account the geometry and spectrum of the light beam, the geometry of the semiconductor, the three-photon absorption coefficient of the semiconductor, and the loss of signal due to diffusion and recombination of electrons in the conduction band. The accuracy of such modeling may be verified by using a laser as the light source, which is expected to have $g^{(3)}(0,0)=1$.

Detecting Entangled Three-Photon States

System 100 may optionally be used to detect and count entangled three-photon states emitted by a light source 102, for example a light source that is used for quantum communication or quantum computing. An entangled three-photon state may be defined as a three-photon quantum state with a wave function that is not the product of three single-photon wave functions. System 100 can be used to count such entangled three-photon states, as long as the light source, or any source of background light reaching the semiconductor, does not produce enough single photons or two-photon states so that three photons of the right total energy are likely to be present in the semiconductor simultaneously, within a coherence time, and produce three-photon absorption events. In some embodiments of the invention, at least 50%, or at least 80%, or at least 90%, or at least 95%, or at least 99%, of the three-photon absorption events in the semiconductor are due to the entangled three-photon states emitted by the light source. For these applications, it is useful to count three-photon absorption events, which each correspond to one emitted three-photon state, rather than only finding a time averaged rate of three-photon absorption.

Quantum communication includes quantum cryptography, in which a communication channel can be made secure against wiretapping because any measurement of an entangled state can be detected, as well as quantum teleportation, in which an entangled quantum state can be transferred from one location to another location over a classical communication channel, by first arranging to split an entangled state between the two locations.

In quantum computing, an entangled state with many degrees of freedom is caused to evolve in a way that an exponentially large number of classical computations are effectively done in parallel. The output of the calculation is found by performing a measurement on the final state. States with multiple photons are one possible way to implement quantum computing.

A light source producing entangled multi-photon states, for example three-photon states, may also be used for quantum metrology or lithography, and in the case of three-photon states, a three-photon counting system, such as system 100, may be used to detect them. In particular, entangled states of N photons, called NOON states, have advantages over single photons in metrology and lithography, because they may have N times greater resolution than single photons, for light of the same photon energy. The Wikipedia article on NOON states, downloaded from <http://en.wikipedia.org/wiki/NOON_state> on Dec. 26, 2010, describes NOON states of photons, some methods that have been used to create them, and some of their possible uses. This article is hereby incorporated herein by reference.

A system similar to system 100 may be used, for example, to monitor the performance of a light source used for quantum communication, computing, lithography or metrology, to make sure it is emitting entangled three-photon states at the proper rate, or it may be used to verify the design of such a light source, or to tune the parameters of such a light source in order to optimize its performance.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non-limiting fashion.

Here we present a three-photon counter, in which input photons are absorbed as triplets by three-photon absorption (3PA) in a photomultiplier tube (PMT) with semiconductor based photocathode. We characterize the sensitivity and response time of the three-photon counter at the short-infrared wavelength range of 1800-1900 nm with 170 fsec pulses generated by optical parametric oscillator (OPO) at 81 MHz. The detector employed in our experiment is a commercial GaAsP PMT (Hamamatsu H7421-40) with an optimal dark-count level below 50 counts/sec at 273 K, designed for efficient single photon detection at the wavelength range of 300-720 nm. Its bandgap enables significant 3PA at the examined wavelength range. The photocurrent emitted from the GaAsP photocathode is in general given by:

$$J(t) = \alpha P(t) + \beta \frac{P(t)^2}{S} + \gamma \frac{P(t)^3}{S^2} \quad (1)$$

where P is the incident power, S is the spot size on the detector and $\alpha$, $\beta$ and $\gamma$ are the one-, two- and three-photon coefficients of the semiconductor. In our experiments, since photon energies are well below half the energy of the bandgap, considering the band-tail, the first two terms in Eq. 1 are negligible. In order to assure that no residual visible or near-infrared light from the OPO remains in the detected beam, both Si and Ge filters were used. As can be seen from Eq. 1, the sensitivity of the three-photon detection is improved by the spot size; therefore an aspherical lens with relatively high numerical aperture, 0.66, was used to focus the beam on the photocathode.

Measurement of the number of counts due to 3PA at 1800 nm, as a function of the mean power monitored simultaneously through a beam-splitter using InGaAs photo-receiver extended to 2.2 μm, resulted in a cubic dependence (FIG. 4) and a clear signal above the dark-count level for pulse energies down to 500 fJ. The responsivity of the detector was measured for the spectral range of 1800-1900 nm and a dark-count level of 500 counts/sec was subtracted (FIG. 4 inset), showing good agreement with theory (see V. Nathan, A. H. Guenther, and S. S. Mitra, "Review of multiphoton absorption in crystalline solids," J. Opt. Soc. Am. B 2, 294-316 (1985)), giving for the leading term:

$$\gamma \geq (3E_{ph} - E_g)^{1/2} \quad (2)$$

where $E_{ph}$ is the energy of the photon, and $E_g$ is bandgap energy, taken in our calculations to be 1.95 eV, as was estimated from the behavior of the one photon absorption (1PA).

Since the presented detector is highly attractive for ultrafast measurements, its time response characteristics are of great importance. Although the electron transition time is much faster than response times of any electronic circuitry, the time jitter of the PMT response can be affected by two major factors: the time spread in the dynode electron multiplication, and the time spread in the photoelectron emission from the photocathode determined by the diffusion times to the surface of the photocathode. The diffusion times are dependent on the charge distributions within the semiconductor photocathode. As the absorption coefficient of 3PA is much lower than that of 1PA, it is expected that the population of the 3PA-generated carriers will be more spread over the photocathode depth, causing an increase in time spread of the photoelectron emission from the photocathode.

Figure 5:
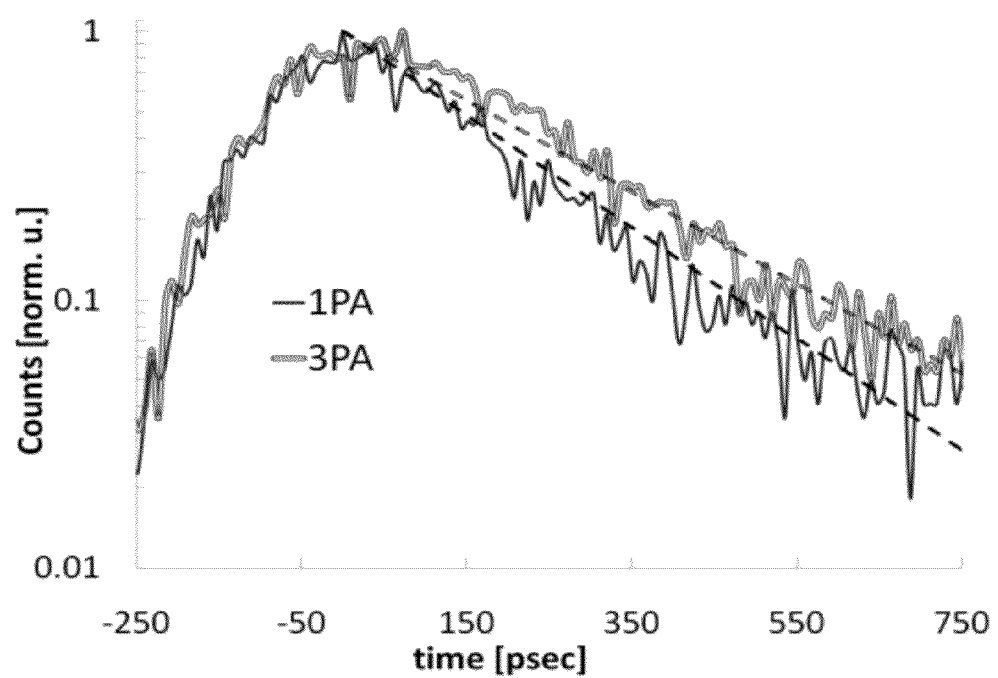
FIG. 5 is a plot of test data showing the time distribution of the output signal of the photomultiplier tube for three-photon absorption and one-photon absorption, relative to the arrival time of the photons, in an experiment performed according to an exemplary embodiment of the invention.

In order to characterize the 1PA and 3PA detection time jitter, we have performed time-resolved photon counting measurements. For this characterization we used a start-stop setup where time interval histograms between photon detections and generated femtosecond pulses were measured using a time interval and frequency counter (SR620 Stanford Research Systems) (FIG. 5). For 1PA the measured time jitter has an exponential decay of ~210 psec (full width half maximum—350 psec), whereas the 3PA detection has a time jitter with an exponential decay of ~250 psec (full width half maximum—390 psec). Therefore, the photoelectron diffusion in the photocathode was shown to have only a minor effect on the overall 3PA detection time response relative to the 1PA detection. It is noted that every point on the 3PA graph in FIG. 5 represents a detection of three photons on a time scale of fsec, and the relatively large time scale of the jitter is just a consequence of the processes following the absorption, therefore it does not prevent ultrafast measurements, similar to those conducted by F. Boitier, A. Godard, E. Rosencher, and C. Fabre, "Measuring photon bunching at ultrashort time scale by two-photon absorption in semiconductors," Nat. Phys. 5, 267-270 (2009).

The efficiency of the three-photon counter can be further enhanced by several simple technical improvements, namely: decreasing the dark-count to its optimal value, adding suitable anti-reflection coating on the front glass of the detector, and redesigning the distance between the glass and the photocathode to allow better focusing. Another enhancement can be achieved by employing gated measurements synchronized with the source for pulsed light. The method can also be easily implemented for the telecom wavelengths around 1.55 μm by bandgap engineering.

In conclusion, we have demonstrated experimentally three-photon counting by 3PA in a commercial GaAsP photomultiplier tube and characterized its spectral and temporal response. This novel detector may pave the way for classical and quantum applications in ultrafast optics and for unique quantum characterization of light sources.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for measuring one or more characteristics of light of a photon energy $E_{ph}$ from a light source, that can be determined from measuring three-photon absorption events, the system comprising:
   a) a detector having a band gap material characterized by gap energy between 2.1 and 3 times $E_{ph}$;
   b) an optical element configured to concentrate a beam of light from the light source on the detector;
   c) a signal amplifier that amplifies an output signal indicative of when three photons produced by the light source undergo a three-photon absorption event in the band gap material; and
   d) an analyzer that analyzes the output signal to count or measure a rate of the three-photon absorption events, and determines the one or more characteristics of the light from the light source.

2. A system according to claim 1, also including the light source.

3. A system according to claim 2, wherein the light source and optical element are configured for producing a light intensity I on the detector, and the band gap material has a thickness of at least 0.5 times a minimum of an absorption length for three-photon absorption of light of photon energy $E_{ph}$ and intensity I in the band gap material, and a Rayleigh length for the light beam concentrated on the band gap material.

4. A system according to claim 1, wherein the band gap material has a thickness no greater than twice a diffusion length of electrons in the conduction band of the band gap material.

5. A system according to claim 2, wherein the optical system concentrates the light from the light source so that more than half of the power falls within a spot smaller than 10 wavelengths in diameter, on the detector.

6. A system according to claim 2, wherein the light source produces few enough photons of energy greater than half the gap energy of the band gap material, so that any two-photon or one-photon absorption in the detector contributes less to the output signal than three-photon absorption, by at least a factor of 10.

7. A system according to claim 2, comprising a filter that filters out enough photons of energy greater than half the gap energy of the band gap material, so that any two-photon or one-photon absorption in the detector contributes less to the output signal than three-photon absorption, by at least a factor of 10.

8. A system according to claim 2, wherein more than 90% of the three-photon absorption events produced in the band gap material by photons from the light source are due to entangled three-photon states, and the one or more characteristics comprise a number of entangled three-photon states emitted by the light source.

9. A system according to claim 1, wherein the one or more characteristics comprise a magnitude and direction of asymmetry in a shape of pulses produced by the light source, and the analyzer is configured to find the magnitude and direction of asymmetry from the output signal.

10. A system according to claim 9, also comprising the light source, wherein the pulses produced by the light source have full width at half maximum intensity shorter than 1 picosecond.

11. A system according to claim 1, wherein the one or more characteristics comprise a complete pulse shape of pulses produced by the light source, and the analyzer is configured to find the complete pulse shape from the output signal.

12. A system according to claim 1, also including the light source, wherein the light source is a pulsed light source, and one or both of the signal amplifier and the analyzer is gated so that data is used only from a time interval around each pulse, that is shorter than an interval between pulses.

13. A system according to claim 1, wherein the one or more characteristics comprise a third order coherence function of the light source, and the analyzer is configured to find the third order coherence function from the output signal.

14. A system according to claim 13, wherein the third order coherence function has a sensitivity for pulsed light better than 500 femtojoule per pulse at a timescale shorter than 1 femtosecond.

15. A system according to claim 13, also including the light source, wherein the light source comprises a polariton laser.

16. A system according to claim 1, wherein the response time of the band gap material and the signal amplifier are short enough so that the time resolution of the output signal is shorter than 1 nanosecond.

17. A system according to claim 1, wherein the signal amplifier comprises a photomultiplier tube.

18. A system according to claim 1, wherein the signal amplifier comprises an avalanche photo diode.

19. A system according to claim 1, also including a light source modulator, configured to modulate the intensity of the beam of light concentrated on the detector by a modulation frequency, wherein the analyzer is configured to find a component of the output signal modulated at 3 times the modulation frequency, due to three-photon absorption.

20. A system according to claim 1, wherein the detector comprises an anti-reflection coating suitable for light of photon energy $E_{ph}$.

21. A system according to claim 1, wherein the detector comprises a resonant cavity for light of photon energy $E_{ph}$.

22. A system according to claim 21, wherein the resonant cavity comprises one or more of a photonic crystal, a Fabry-Perot cavity, and a plasmonic cavity.

23. A system for measuring one or more characteristics of light of a photon energy $E_{ph}$ from a light source, that can be determined from measuring three-photon absorption, the system comprising:
  a) a detector having a band gap material characterized by gap energy between 2.1 and 3 times $E_{ph}$, comprising an anti-reflection coating suitable for light of photon energy $E_{ph}$;
  b) an optical element configured to concentrate light from the light source on the detector;
  c) a signal amplifier that amplifies an output signal indicative of when three photons produced by the light source undergo a three-photon absorption event in the band gap material, the output signal being usable for counting or measuring a rate of three-photon absorption events and determining the one or more characteristics of light from the light source.

24. A method of measuring one or more characteristics of light of a photon energy $E_{ph}$ from a light source, that can be determined from measuring three-photon absorption events, the method comprising:
  a) producing light from the light source;
  b) concentrating the light on a detector having a band gap material characterized by band gap between 2.1 and 3 times $E_{ph}$;
  c) collecting an electron excited to the conduction band of the band gap material by a three-photon absorption event, caused by light from the light source;
  d) amplifying a current of the collected electron to produce an indication of the three-photon absorption event in an output signal; and
  e) analyzing the output signal to count or measure a rate of the three-photon absorption events and determine the one or more characteristics of the light from the light source.

25. A method according to claim 24, wherein the light source is a pulsed light source, and the one or more characteristics comprise a magnitude and direction of asymmetry of the shape of pulses produced by the light source.

26. A method according to claim 24, wherein the one or more characteristics comprise a third order coherence function of the light source.

27. A method according to claim 24, wherein the one or more characteristics comprise a number of entangled three-photon states emitted by the light source.

28. A method according to claim 24, wherein the band gap material has a thickness of at least 0.5 times a minimum of an absorption length for three-photon absorption of the light concentrated on the semiconductor detector, and a Rayleigh length for the light concentrated on the semiconductor detector.

29. A method according to claim 24, wherein more than half of the power of the light concentrated on the detector falls within a spot smaller than 10 wavelengths in diameter.

* * * * *